Patented May 1, 1923.

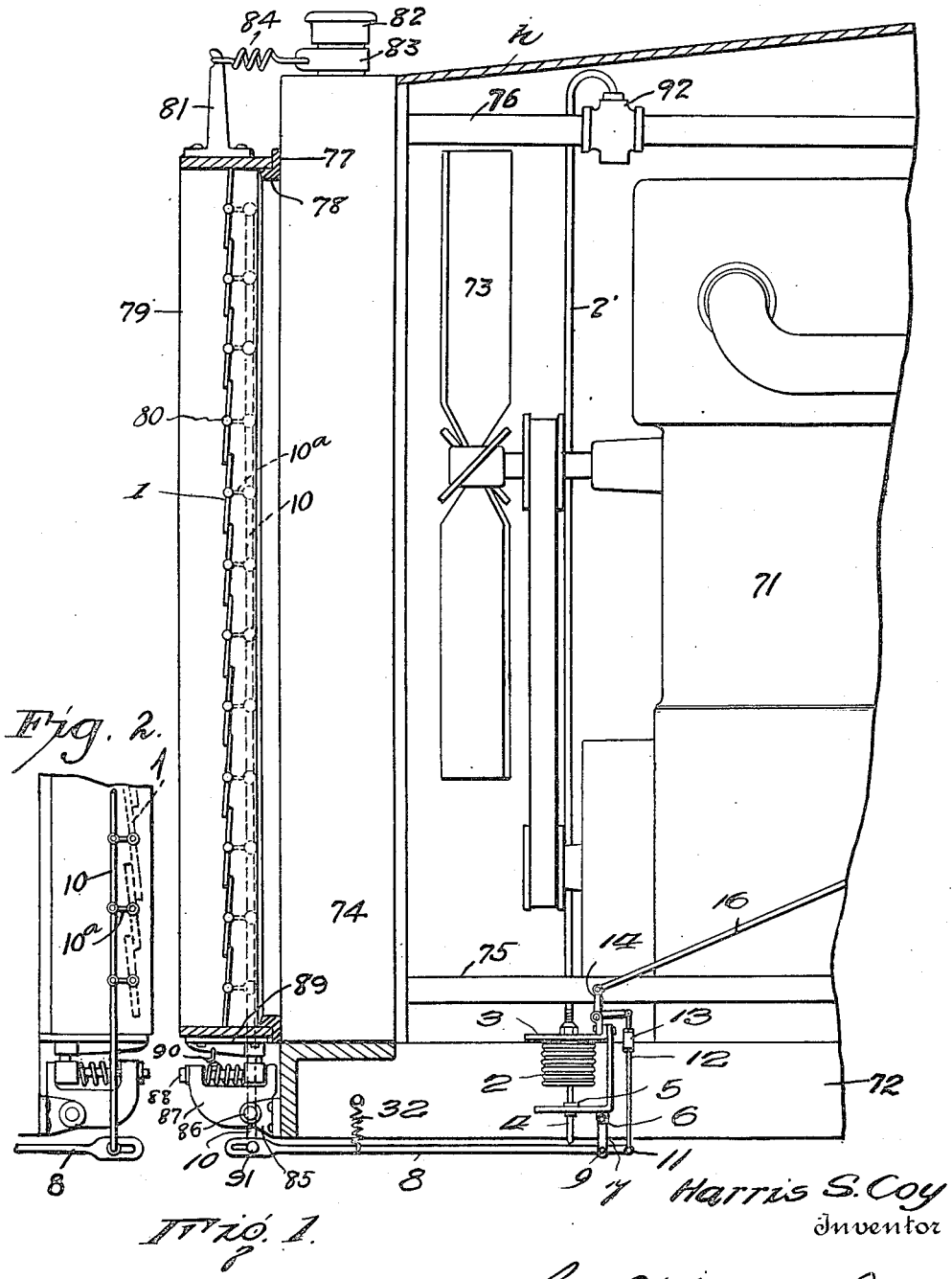

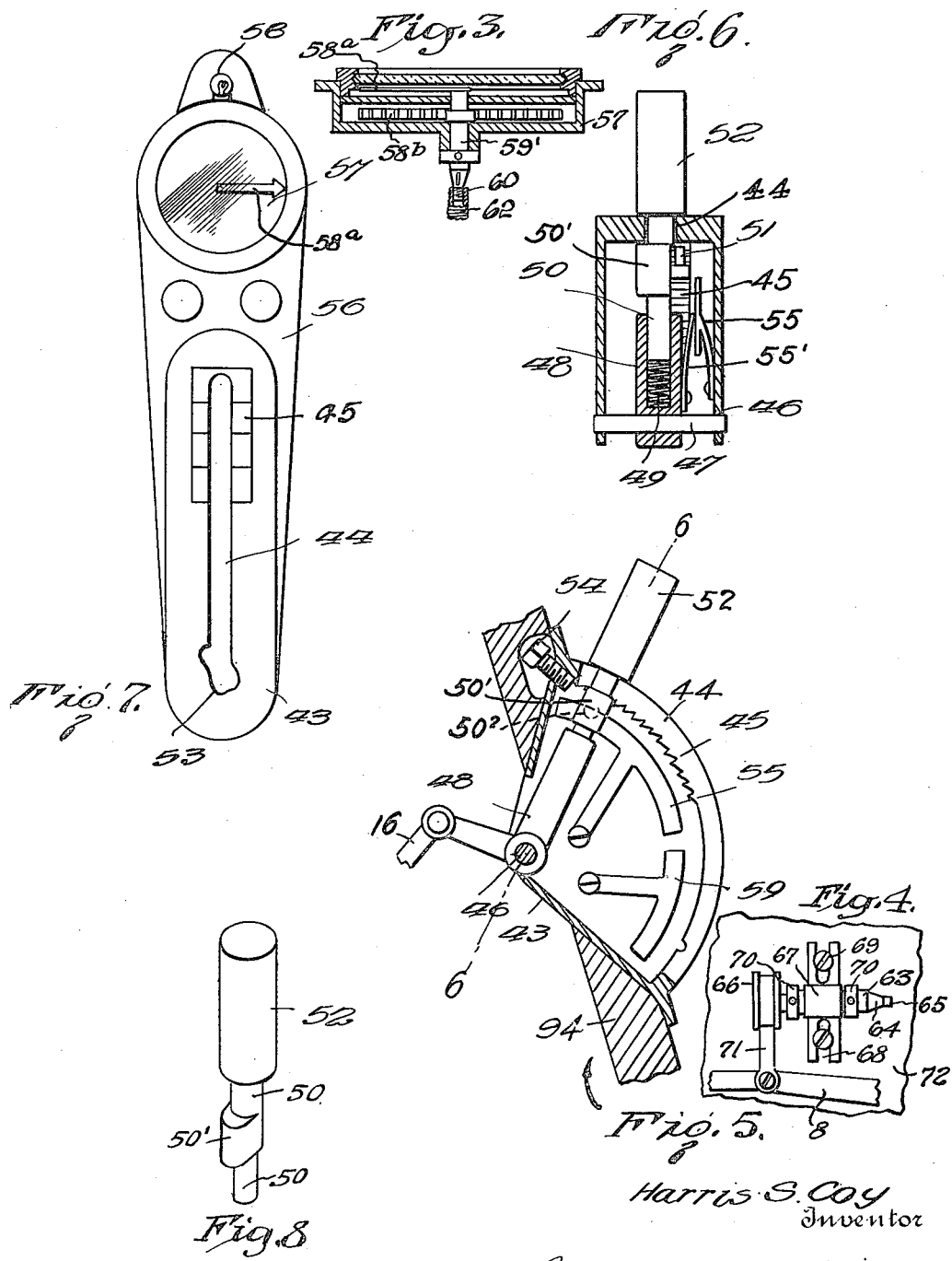

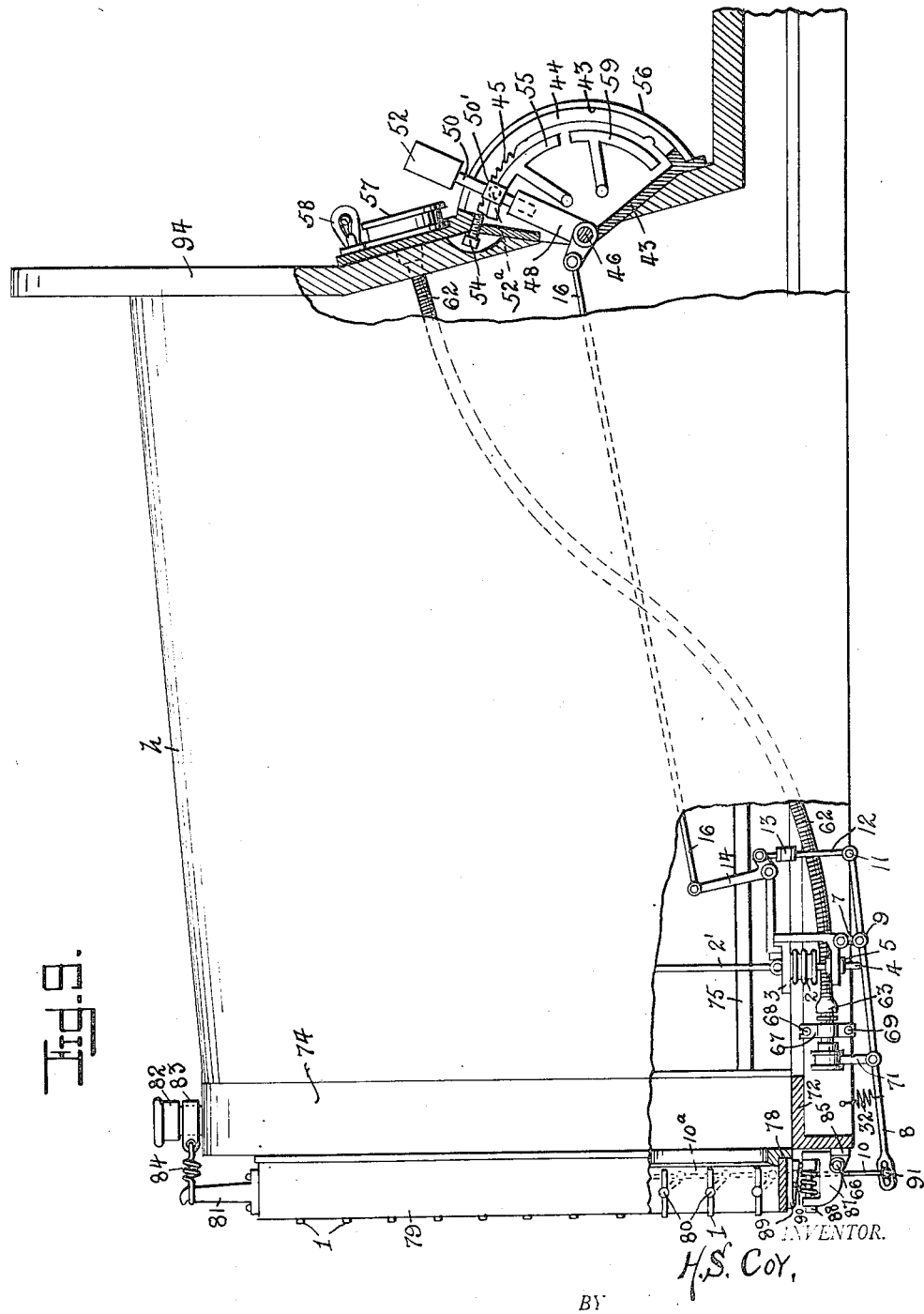

1,453,379

UNITED STATES PATENT OFFICE.

HARRIS SHAUL COY, OF ANDERSON, INDIANA.

MANUAL OPERATING MEANS FOR AUTOMATIC TEMPERATURE-CONTROL SYSTEMS.

Application filed March 5, 1918. Serial No. 220,583.

*To all whom it may concern:*

Be it known that I, HARRIS S. COY, a citizen of the United States, residing at Anderson, in the county of Madison and State of Indiana, have invented certain new and useful Improvements in a Manual Operating Means for Automatic Temperature-Control Systems, of which the following is a specification.

This invention relates to cooling systems employed in connection with the motors of motor driven vehicles, having means whereby the air deflecting blades usually employed upon the radiators of motors of this class are automatically controlled by the increase or decrease of the temperature of the cooling liquid through the action of suitable thermally operative devices, and has for one of its objects to provide a device whereby the air deflecting blades may be manually controlled by the operator irrespective of the automatically operative means.

Another object of this invention is to provide a device of this character having means whereby the operator can close the deflecting blades and thus shut off the influx of air when required, or in cold weather when he leaves the vehicle, and thus retains the high temperature of the circulating fluid and keep the motor warm for a longer period, thereby facilitating the starting of the motor on the return of the operator.

With these and other objects in view the invention consists of certain novel features of construction as hereinafter shown and described and then specifically pointed out in the claims, and in the drawings illustrative of the preferred embodiment of the invention;—

Figure 1 is a side elevation of a conventional temperature control system for an internal combustion motor partly in section and having a portion of the improved manually operative means connected thereto.

Fig. 2 is a sectional detail illustrating the construction of the deflector blade operating means.

Fig. 3 is an enlarged section through the indicating gage which is associated with the manually operative means.

Fig. 4 is a detail illustrating the connection between the operating lever and the gage.

Fig. 5 is a sectional view, enlarged, of the manually operative mechanism for controlling the movement of the air deflector blades.

Fig. 6 is a section on the line 6—6 of Fig. 6.

Fig. 7 is a front elevation, enlarged, of the face member of the structure shown in Fig. 5.

Fig. 8 is a detached perspective view of the operating lever of the mechanism shown in Fig. 6.

Fig. 9 is a side elevation, partly in section, of the forward portion of a conventional motor driven vehicle with the improvements applied.

In the drawings like reference characters are employed for corresponding parts in all the figures.

For the purpose of illustration the improvements are shown applied to a conventional motor and the radiator and the air deflecting blades associated therewith. A portion of the motor is represented at 71 and mounted on the main frame or chassis 72 of the vehicle, a portion of the hood being represented at $h$.

The fan is represented at 73, the radiator shell at 74, the inflow pipe from the engine jacket to the radiator at 75, the outflow pipe between the radiator and the engine jacket at 76.

Attached to the forward face of the radiator shell is an open supporting frame 77, the latter including an encompassing shoulder 78, and engaging the shoulder is another frame 79 in which the air deflector blades 1 are pivoted by their journals at 80.

Attached to the frame 79 is a standard 81, and mounted on the filler tube 82 of the radiator is a clip 83. A holding spring 84 is coupled respectively to the clip 83 and standard 81 and thereby yieldably supports the frame 79 in position, at its upper side, upon the shoulder 78 of the frame 77.

Attached to the frame 72 of the vehicle is an ear 85, and pivoted at 86 in the ear is an arm 87. At its upper side the arm 87 is provided with spaced bearings in which a rod 88 is supported.

Attached to the frame 79 is a bracket device 89 having a depending portion slidably engaging the rod 88. A spring 90 is carried by the rod 88 and exerts its force to hold the bracket 89 and the lower part of the frame 79 connected therewith yieldably upon the shoulder 78 of the frame 77. The springs 84 and 90 coact to yieldably support the frame 79 and the blades carried thereby in position upon the frame and at the same time the blade supporting frame is hingedly supported at its lower end upon the pivot 86, and may be turned downward by releasing the spring 84, to provide access to the outer face of the radiator.

Connected to the frame 72 is a bracket device 3, and pivoted at 6 to the bracket is a link 7. Pivoted at 9 to the lower end of the link is a relatively long lever 8. At its forward end the lever 8 is longitudinally slotted to receive a pivot pin 91 on the lower end of a rod 10, the latter extending upwardly through the frame and in the rear of the blades 1. The rod 10 is connected by small arms 10ª to each of the pivots 80 of the blades 1. A spring 32 holds the lever 8 yieldably in its upper position with the blades 1 in closed position as shown in Fig. 1.

By this arrangement it will be obvious that vertical movement of the lever 8 will be transmitted to the blades 1. It will also be obvious that the frame 79 with its attachment when moved outwardly on its pivot 91 will not cramp the lever 8 or rod 10 by reason of the longitudinal slot in the lever 8.

Attached to the upper member of the bracket 3 is an expansible element 2, and associated with the latter is a foot member 4, which operates through a guide 5 upon the lower part of the bracket 3 and bears loosely at its lower end upon the lever 8.

Extending upwardly from the expansible element 2 is a small pipe 2'.

The lever 8 extends rearwardly of the pivot 9, and is coupled at the rear end at 11 to a rod 12, the latter in turn connected to one arm of a bell crank lever 14 pivoted at its elbow to the bracket 3. The rod 12 is provided with a suitable turn buckle device 13 to enable the rod to be adjusted.

Connected to the other arm of the bell crank lever 14 is an operating rod 16 leading to a point adjacent the instrument board of the vehicle, a portion of which is represented at 94 in Figures 5 and 9.

By this arrangement it will be obvious that the longitudinal movement of the rod 16 will actuate the lever 8 against the resistance of the spring 32 and thus actuate the blades 1, but without interfering with the operation of the expansive element in the member 2—2' and 92 as the movement of the lever 8 where it engages the plunger is slight and the fluid in the bellows device 2 will be slightly compressed.

The manually operative means is illustrated in Figs. 5—6—7—8 and 9 and includes a shell or casing represented as a whole at 43, preferably with two angular sides and a segmental side and embedded by its angular sides in the instrument board 94 with the segmental side projecting rearwardly of the rear face of the instrument board. The side faces of the shell 43 are imperforate while the segmental face is longitudinally slotted as represented at 44. The inner face of the segmental side of the casing 43 is provided with ratchet teeth 45.

Mounted through the shell 43 at the center of the segmental portion of the shell is a shaft 46, and mounted to swing upon the shaft is a bell crank lever with one arm 48 tubular and within the shell and the other arm pivoted to the rear end of the rod 16. Slidable in the tubular arm 48 is a rod 50, and fitting in the tubular arm is a spring 49 exerting its force to maintain the rod 50 yieldably in outer position.

The rod 50 extends through the slot 44 and is provided with an operating handle 52 externally of the segmental side of the shell. Extending from one side of the rod 50 is a projection 50' to form a stop to limit the movement of the rod both inwardly and outwardly.

Extending from the opposite side of the rod 50 is a pawl 51 held in engagement with the ratchet teeth 45 by the action of the spring 49 and releasable therefrom by inward pressure upon the handle 52.

A set screw 54 is tapped through the shell 43 and operates to limit the movement of the rod 50 in one direction.

By this arrangement it will be obvious that the rod 16 may be manually operated to any required extent within the range of the ratchet teeth 45 and thus adjust the blades 1 and hold them locked in any required position.

Mounted on one side wall of the shell 43 and insulated therefrom, are segmental contact plates 55 and 59, the rod 50 being provided with a "brush" or contact indicated at 50² to engage the contacts 55 and 59.

A curved plate 56 is arranged over the segmental side of the shell 43 and slotted to conform to the slot 44, and extended at its upper end to support an indicator device 57.

The member 56 is provided with graduation 58 to denote the position of the rod 50 so that the operator may know to what degree the blades 1 are open or closed.

The contact 55 corresponds substantially in length to the ratchet teeth 45, while the contact 59 is spaced from the contact 55 so that the "brush" 50² will not engage both contact plates at the same time.

When the handle 52 and the rod 50 are moved into the position shown in dotted lines in Fig. 5, the rod 16 will dispose the forward end of the lever 8 in its upper position and hold the blades 1 in closed position, as shown in full lines in Fig. 1, and when the handle 52 and rod 50 are moved into the position shown by full lines in Fig. 5, the lever 8 will be disposed in the position shown by dotted lines in Fig. 1 and hold the blades 1 in open position.

In Fig. 4 is shown the device operative by the vertical movement of the lever 8 to actuate the indicator, represented conventionally at 57.

The indicator or gage 57 is of the spring control type, and includes a rotatable hand 58ª movable over graduations on the face of a dial, said hand being placed under tension by a spring 58ᵇ. A shaft 59′ is arranged in the gauge and carries the indicator hand 58ª, said shaft having the outer end tapered and provided with a screw threaded extremity 60 and a transversely disposed key way 61, whereby connection may be had with one end of a flexible shaft 62. The opposite end of the shaft 62 extends into engagement with a driving shaft 63 supported adjacent the lever 8. One end of the shaft 63 is tapered and formed with a transversely disposed key way 64 and a screw threaded extension 65. The opposite end of the shaft 63 carries a spring controller sheave 66. The drive shaft 63 is mounted in a bearing bracket 67 having its opposite ends slotted as at 68 and adjustably secured to the frame of the automobile at a point in proximity to the lever 8 by means of screws 69 or like fastening devices. To effect longitudinal adjustment of the driving shaft 63 stop collars 70 are adjustably engaged therewith and engaged with the opposite ends of said bearing. A cable, cord or tape 71 has one end secured to the peripheral surface of the sheave 66 while the other end is connected to the contiguous portion of the lever 8. Hence, upon vertical movement of the lever 8, rotary motion will be imparted to the driving shaft 63 and thence transmitted to the shaft 59′ and the rotatable indicator hand 58ª of the gauge 57, causing the hand to correspond to graduations on the dial of the gauge, thus indicating to the operator the exact position of the air deflector blades.

With an apparatus thus constructed the operation is as follows:—

If the cooling fluid be heated above the normal, the expansible element in the thermostat device 92 will expand the member 2 and cause the foot 4 to depress the lever 8 and open the blades 1 and permit a free circulation of outside air through the radiator and thus reduce the temperature of the cooling fluid, the degree of the opening of the blades being thus automatically controlled.

In cold weather it is desirable to keep the engine at a relatively high temperature when the operator leaves it, and to effect this result, the handle 52 is moved into its lower or "release" position with the "brush" 50² in contact with the plate 59, thus throwing the lever 8 into position to fully close the blades 1 and cut off the air and hold the heat.

On the return of the operator, the handle 52 is again applied and elevated to re-engage the "brush" 50² with the contact 55 and again couple the parts to enable the lever 8 to be actuated as before described.

If required, the blade engaging end of the lever 8 may be moved into its lowest position out of the influence of the member 4 and with the blades 1 wide open.

All the movements of the lever 8 are registered by the indicator 57 thus enabling the operator to know the exact status of the blades either day or night.

The outer end of the rod 50 is formed with a recess or pocket and the handle member 52 is formed to engage in the socket. At its outer end the rod 50 is flush with the outer face of the member 43 as shown so that when the handle member is detached no part of the rod projects. By this means the handle member operates as a key to actuate the rod when applied, but renders the rod inoperative when removed.

By this arrangement fradulent operation of the manually operative means will be prevented as the rod can be actuated only by applying the handle member thereto.

The preferred embodiment of the invention is disclosed in the drawings and set forth in the specifications, but it will be understood that any modifications within the scope of the claims may be made in the construction without departing from the principle of the invention or sacrificing any of its advantages.

Having thus described the invention what is claimed as new is:

1. In a motor driven vehicle including a radiator, a plurality of air current controlling blades associated with said radiator, a movable member operatively coupled to said air current controlling blades, a casing including a segmental portion and having segmentally arranged ratchet teeth, a member swinging within said casing and having a longitudinal socket, coupling means between said swinging member and said blade engaging member, a rod slidably engaging in the socket of said swinging member and having a pawl device carried by said rod and engaging said ratchet teeth, a spring within the socket of said swinging member and operating to hold the pawl in yieldable engagement with the ratchet teeth, and a handle member having a reduced portion to engage the socket of said swinging member.

2. In a motor driven vehicle including a radiator, a plurality of air current controlling blades associated with said radiator, a movable member operatively coupled to said air current controlling blades, a casing including a segmental portion and having segmentally ratchet teeth, a member swinging within said casing and having a longitudinal socket, coupling means between said swinging member and said blade engaging member, a rod slidably engaging in the socket of said swinging member and having a pawl device carried by said rod and engaging said ratchet teeth, a spring within the socket of said swinging member and operating to hold the pawl in yieldable engagement with the ratchet teeth, a handle member having a reduced portion to engage in the socket of said swinging member, an indicator device and means operative by said movable member to actuate said indicating device.

In testimony whereof, I affix my signature hereto.

HARRIS SHAUL COY.